United States Patent [19]
Honda et al.

[11] Patent Number: 5,703,466
[45] Date of Patent: Dec. 30, 1997

[54] CHARGING CONTROL APPARATUS

[75] Inventors: Kensuke Honda; Hiroshi Murakami; Kazunori Watanabe, all of Wako, Japan

[73] Assignee: Honda Giken Kogyo Kabushiki Kaisha, Tokyo, Japan

[21] Appl. No.: 691,653

[22] Filed: Aug. 2, 1996

[30] Foreign Application Priority Data

Aug. 2, 1995 [JP] Japan .................................. 7-197753

[51] Int. Cl.$^6$ .............................. H02J 7/00; H01M 10/46
[52] U.S. Cl. .............................. 320/23; 320/32; 320/35; 320/39; 320/48
[58] Field of Search .............................. 320/21, 22, 23, 320/24, 32, 35, 39, 48

[56] References Cited

U.S. PATENT DOCUMENTS

| | | | |
|---|---|---|---|
| 5,367,244 | 11/1994 | Rose et al. | 320/23 |
| 5,412,306 | 5/1995 | Meadows et al. | 320/22 X |
| 5,561,360 | 10/1996 | Ayres et al. | 320/23 X |
| 5,596,259 | 1/1997 | Mino et al. | 320/21 |

FOREIGN PATENT DOCUMENTS 60-128832  7/1985  Japan .

*Primary Examiner*—Peter S. Wong
*Assistant Examiner*—Patrick B. Law
*Attorney, Agent, or Firm*—Nikaido Marmelstein Murray & Oram LLP

[57] ABSTRACT

A charging control apparatus for controlling a charging current supplied to a secondary battery has a pre-charge secondary battery status decision circuit for determining a discharged status of the secondary battery when it starts being charged, and a charging pattern control circuit for controlling the charging current supplied to the secondary battery at progressively smaller constant stepwise levels according to a charging pattern based on the discharged status of the secondary battery as determined by the pre-charge secondary battery status decision circuit each time the voltage across the secondary battery reaches a predetermined value, and charging the secondary battery with the charging current which is controlled at the progressively smaller constant stepwise levels.

6 Claims, 4 Drawing Sheets

FIG. 4(A)

| TEMPERATURE RANGE | 45°C > T ≧ 40°C |
|---|---|
| SWITCHING VOLTAGE | 345.6V |
| CHARGING PATTERN | 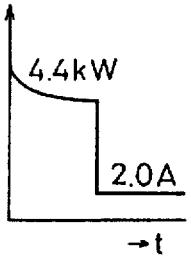 |

FIG. 4(B)

| TEMPERATURE RANGE | 40°C > T ≧ 20°C |
|---|---|
| SWITCHING VOLTAGE | 345.6V |
| CHARGING PATTERN | 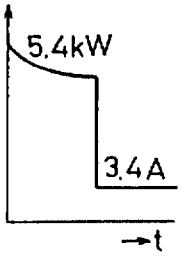 |

FIG. 4(C)

| TEMPERATURE RANGE | 20°C > T ≧ 5°C |
|---|---|
| SWITCHING VOLTAGE | 345.6V |
| CHARGING PATTERN | 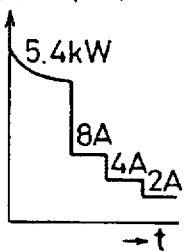 |

FIG. 4(D)

| TEMPERATURE RANGE | 5°C > T > 0°C |
|---|---|
| SWITCHING VOLTAGE | 360V |
| CHARGING PATTERN | 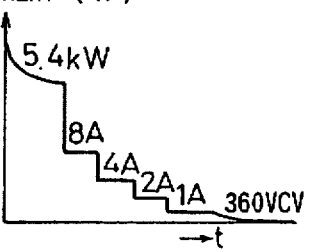 |

FIG. 4(E)

| STATUS | UNIFORMIZING CHARGING, TROUBLE CHARGING |
|---|---|
| SWITCHING VOLTAGE | 360V |
| CHARGING PATTERN | 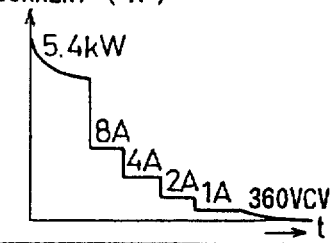 |

FIG. 4(F)

| STATUS | SUPPLEMENTAL CHARGING, LOW START CHARGING |
|---|---|
| SWITCHING VOLTAGE | 360V |
| CHARGING PATTERN | 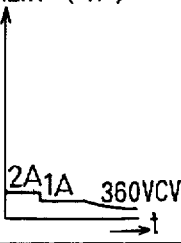 |

5,703,466

CHARGING CONTROL APPARATUS

BACKGROUND OF THE INVENTION

1. Field of the Invention

The present invention relates to a charging control apparatus for controlling a secondary battery charger, and more particularly to a charging control apparatus for controlling a charger based on the status of a secondary battery at the time the secondary battery starts to be charged by the charger.

2. Description of the Related Art

One conventional charging control apparatus for controlling the charging of a secondary battery is disclosed in Japanese laid-open patent publication No. 60-128832. According to the disclosed charging control apparatus, a voltage (charging completion voltage) across the secondary battery when the charging of the secondary battery with a predetermined current is completed is stored as a function of the temperature of the secondary battery in a memory. The temperature of the secondary battery at the time it begins to be charged is detected, and a charging completion voltage corresponding to the detected temperature is read from the memory. The read charging completion voltage is compared in level with a measured voltage across the secondary battery. If the measured voltage is lower than the read charging completion voltage, then the secondary battery is quickly charged with a predetermining charging current until the compared voltages agree with each other. After the compared voltages agree with each other, the charging current is progressively reduced so that the secondary battery will be fully charged without being excessively charged.

Secondary batteries are required to have a long service life by preventing undue degradation thereof as much as possible. Particularly, secondary batteries for supplying electric energy to propel electric vehicles should preferably be operable over a long period of time without replacement because they have a large capacity, tend to suffer great damage when degraded, and cannot easily be replaced. Furthermore, the manner in which an electric vehicle is used depends greatly on the user of the electric vehicle. For example, the secondary batteries on electric vehicles may be left to stand after being charged or may be fully discharged while the electric vehicles are running. Therefore, the secondary batteries may possibly be in various conditions when they start to be charged. Stated otherwise, the secondary batteries need to be charged in those various conditions. Even in those various conditions, the secondary batteries are required to be charged to a fully charged status while being prevented from being unduly degraded- Such requirements cannot be met by the conventional charging control apparatus which charges the secondary battery based on the relationship between the temperature of the secondary battery at the time it starts being charged and the charging completion voltage thereof.

SUMMARY OF THE INVENTION

It is a principal object of the present invention to provide a charging control apparatus for charging a secondary battery based on the discharged status thereof so as not to allow the secondary battery to be degraded.

According to the present invention, there is provided a charging control apparatus for charging a secondary battery, comprising a decision circuit for determining a discharged status of a secondary battery when the secondary battery starts being charged, and a charging pattern control circuit for controlling a charging current supplied to the secondary battery at progressively smaller constant stepwise levels according to a charging pattern based on the discharged status of the secondary battery as determined by the decision circuit each time a voltage across the secondary battery reaches a predetermined value. The discharged status of the secondary battery at the time it starts being charged is determined by the decision circuit. The charging current supplied to the secondary battery each time the voltage across the secondary battery reaches the predetermined value is controlled at progressively smaller constant stepwise levels according to the charging pattern based on the discharged status of the secondary battery as determined by the decision circuit, and the secondary battery is charged with the constant current which is controlled at the progressively smaller constant stepwise levels by the charging pattern control circuit.

Another object of the present invention is to provide a charging control apparatus for reducing stepwise a charging current supplied to a secondary battery to prevent the secondary battery from being degraded when an open voltage of the secondary battery drops below a predetermined value immediately before the secondary battery is charged.

Still another object of the present invention is to provide a charging control apparatus for reducing progressively a charging current supplied to a secondary battery from a predetermining charging current to uniformize different discharged quantities of unit cells of the secondary battery when the total discharged quantity of electric energy from the secondary battery is more than a multiple of a rated capacity of the secondary battery immediately before the secondary battery is charged.

The above and other objects, features, and advantages of the present invention will become more apparent from the following description when taken in conjunction with the accompanying drawings in which a preferred embodiments of the present invention is shown by way of illustrative example.

BRIEF DESCRIPTION OF THE DRAWINGS

FIG. 4(A) is a diagram of a charging pattern for charging a secondary battery under the control of the charging control apparatus when the temperature T of a cell assembly is in the range of 45° C.>T≧40° C.;

FIG. 4(B) is a diagram of a charging pattern for charging a secondary battery under the control of the charging control apparatus when the temperature T of a cell assembly is in the range of 40° C.>T≧20° C.;

FIG. 4(C) is a diagram of a charging pattern for charging a secondary battery under the control of the charging control apparatus when the temperature T of a cell assembly is in the range of 20° C.>T≧5° C.;

FIG. 4(D) is a diagram of a charging pattern for charging a secondary battery under the control of the charging control apparatus when the temperature T of a cell assembly is in the range of 5° C.>T>0° C.;

FIG. 4(E) is a diagram of a charging pattern for charging a secondary battery under the control of the charging control apparatus in uniformizing and trouble charging modes; and FIG. 4(F) is a diagram of a charging pattern for charging a secondary battery under the control of the charging control apparatus in supplemental and low start charging modes.

DETAILED DESCRIPTION OF THE PREFERRED EMBODIMENT

Figure 1:
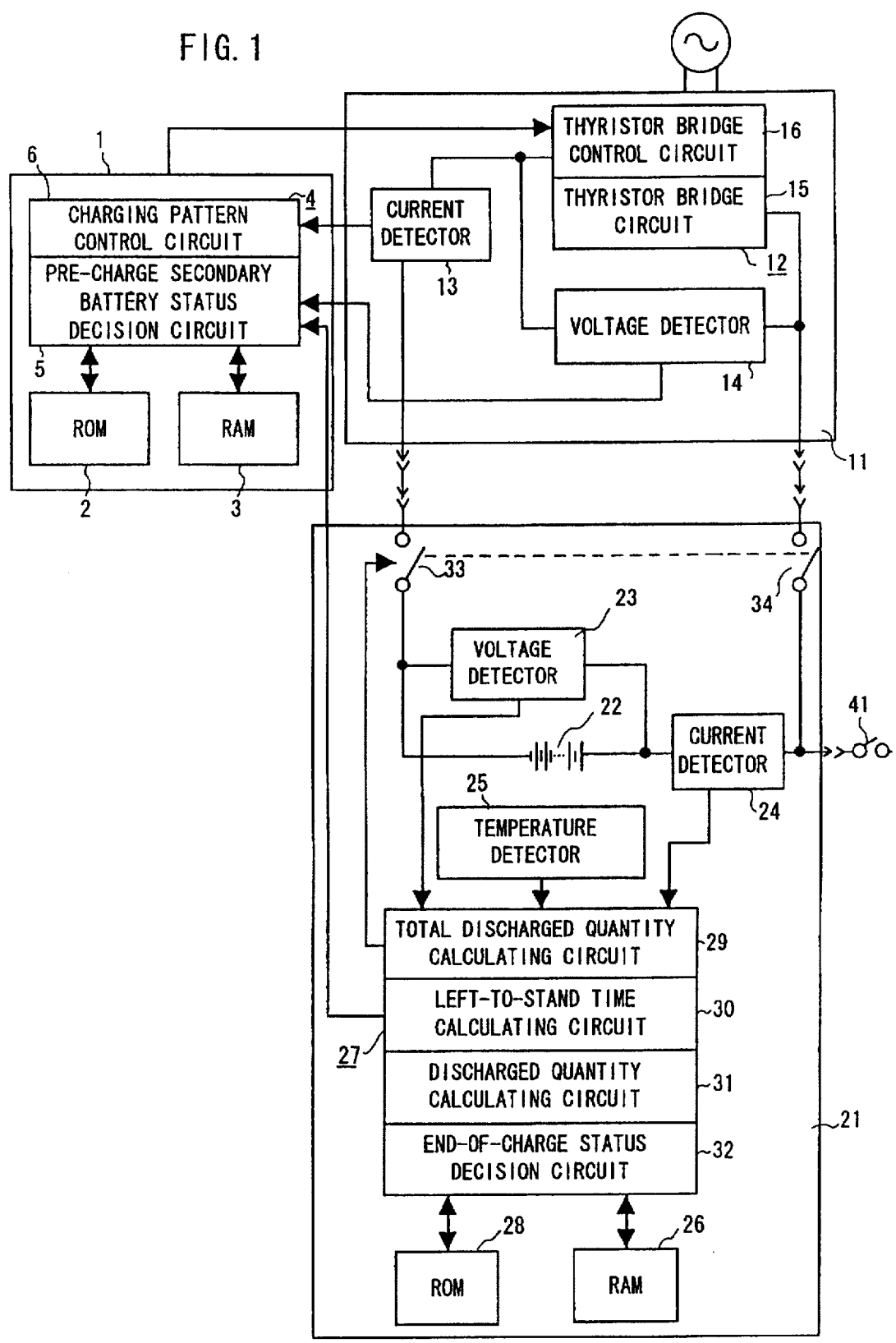
FIG. 1 is a block diagram of a charging control apparatus according to the present invention, a charger controlled by the charging control apparatus, and a secondary battery charged by the charger.

FIG. 1 shows in block form a charging control apparatus according to the present invention, a charger controlled by the charging control apparatus, and a secondary battery charged by the charger.

In FIG. 1, a charging control apparatus 1 according to the present invention determines a status of a secondary battery 21, used propelling an electric vehicle, immediately before the secondary battery 21 starts being charged, and charges the secondary battery 21 according to a charging pattern based on the determined status.

The secondary battery 21 is charged by a charger 11 under the control of the charging control apparatus 1. The charger 11 has a main charger section 12, a current detector 13 for detecting a charging current, and a voltage detector 14 for detecting a charging voltage. The main charger section 12 comprises a thyristor bridge circuit 15 for cooperating with a smoothing circuit (not shown) in converting applied AC electric energy into DC electric energy, and a thyristor bridge control circuit 16 for turning on and off thyristors of the thyristor bridge circuit 15 to control the charging voltage and the charging current.

The secondary battery 21 comprises a cell assembly 22 composed of a plurality of, e.g., 24, series-connected unit storage cells each having a nominal voltage of 12 V, a voltage detector 23 for detecting a voltage across the cell assembly 22, a current detector 24 for detecting a charging current and a discharged current of the cell assembly 22, a temperature detector 25 for detecting an internal temperature of the cell assembly 22, and a CPU (central processing unit) 27, which is backed up by another battery to operate at all times, for being supplied with a detected output signal from the voltage detector 23, a detected output signal from the current detector 24, and a detected output signal from the temperature detector 25, determining a status of the cell assembly 22 based on the supplied signals, updating the determined status at all times, and storing the updated status in a memory 26 which comprises a RAM (random-access memory).

The CPU 27, combined with a ROM (read-only memory) 28 storing a program for controlling the CPU 27, functionally provides a total discharged quantity calculating circuit 29 which is reset when uniformizing charging of the cell assembly is completed and which calculates a total integrated discharged quantity of electric energy from the secondary battery 21 based on a total value of products of discharged current and voltage from the time when the total discharged quantity calculating circuit 29 is reset, a left-to-stand time calculating circuit 30 for calculating an integrated value of periods of time for which the cell assembly 22 is left to stand, neither charged nor discharged, from the time when a switch 41 for connecting the cell assembly 22 to an electric vehicle propulsion motor is turned off to the time when the switch 41 is turned on, a discharged quantity calculating circuit 31 for calculating an actual discharged quantity of electric energy by subtracting the integrated discharged quantity from an integrated charged quantity of electric energy in the cell assembly 22, an end-of-charge status decision circuit 32 for determining an end-of-charge status of the cell assembly 22, e.g., an end-of-charge status in which the charging of the cell assembly 22 is ended when it is not fully charged, or an end-of-charge status in which the charging of the cell assembly 22 is ended when it is fully charged, and a control circuit (not shown) for controlling switches 33, 34 to selectively connect the secondary battery 21 to the charger 11.

The ROM 28 stores, in addition to the program for controlling the CPU 27, self-discharged quantities of electric energy from the cell assembly 22 as a function of voltages across the cell assembly 22. Therefore, the ROM 28 can be searched for a self-discharged quantity of electric energy from the cell assembly 22 based on the voltage across the cell assembly 22 when it is open. The memory 26 has storage areas for storing the detected output signal from the voltage detector 23, the detected output signal from the current detector 24, the detected output signal from the temperature detector 25, the total discharged quantity of electric energy, the left-to-stand time, the discharged quantity of electric energy, an on/off status of the switch 41, a count area for counting the number of times that the charging of the cell assembly 22 is ended when it is not fully charged in cooperation with the end-of-charge status decision circuit 32, and a work area for storing calculation data.

The charging control apparatus 1 has a CPU 4, a ROM 2 which stores a program for controlling the CPU 4 and charging patterns based on status of the secondary battery 21 before it is charged, and a RAM 3. The CPU 4 has a pre-charge secondary battery status decision circuit 5 for reading a detected output signal from the current detector 13 and a detected output signal from the voltage detector 14, and also reading, from the CPU 27, the detected output signal from the voltage detector 23, the detected output signal from the current detector 24, the detected output signal from the temperature detector 25, the total discharged quantity of electric energy, the left-to-stand time, the discharged quantity of electric energy, and the number of times that the charging of the cell assembly 22 is ended when it is not fully charged, and determining a status of the cell assembly 22 immediately before it is charged, based on the read signals, and a charging pattern control circuit 6 for controlling the thyristor bridge control circuit 16 to control output electric energy from the charger 11 to charge the cell assembly 22 according to a charging pattern based on the determined status of the cell assembly 22.

Figure 2:
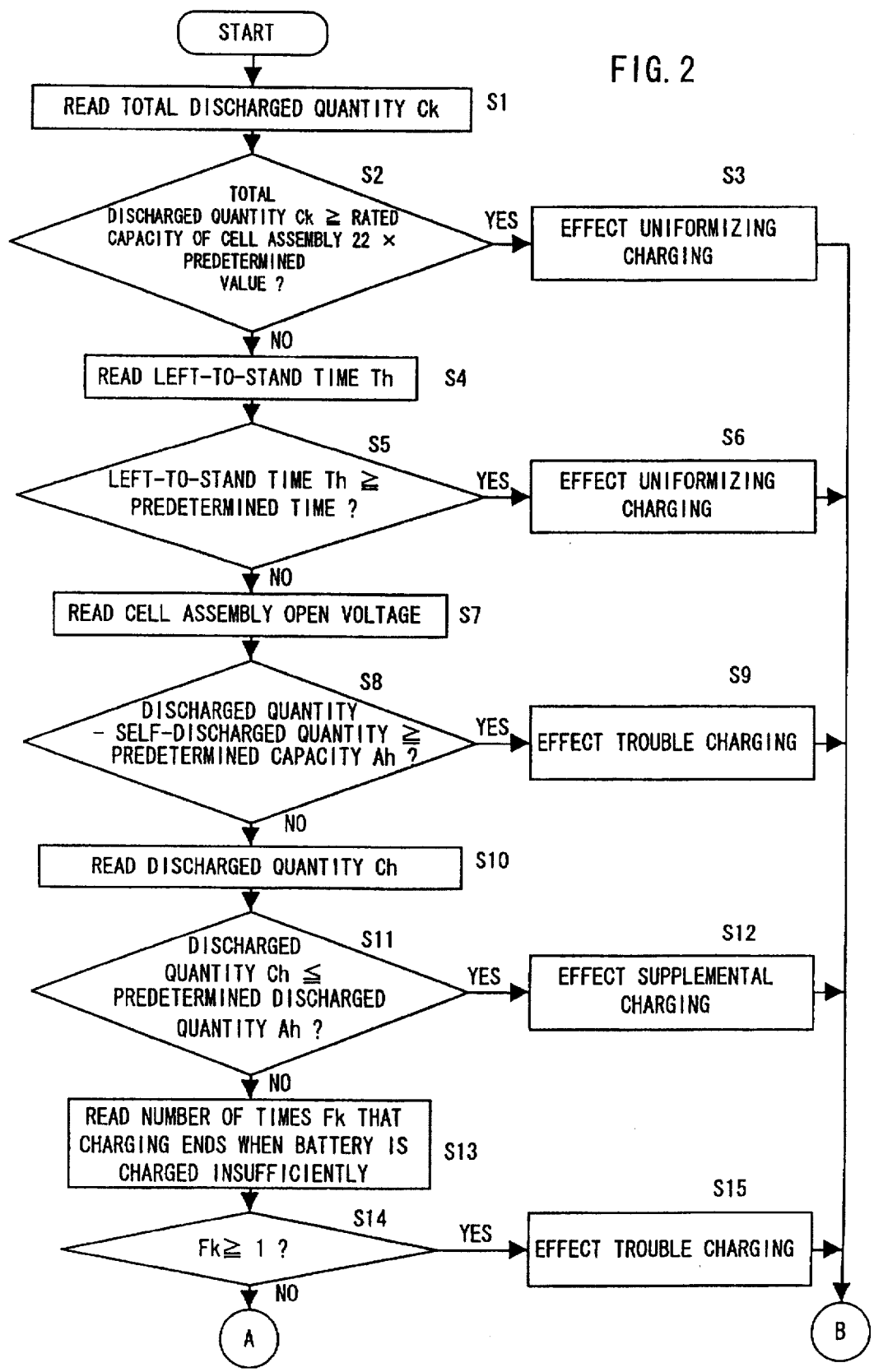
FIGS. 2 and 3 are flowcharts of a control sequence of the charging control apparatus according to the present invention.
Figure 3:
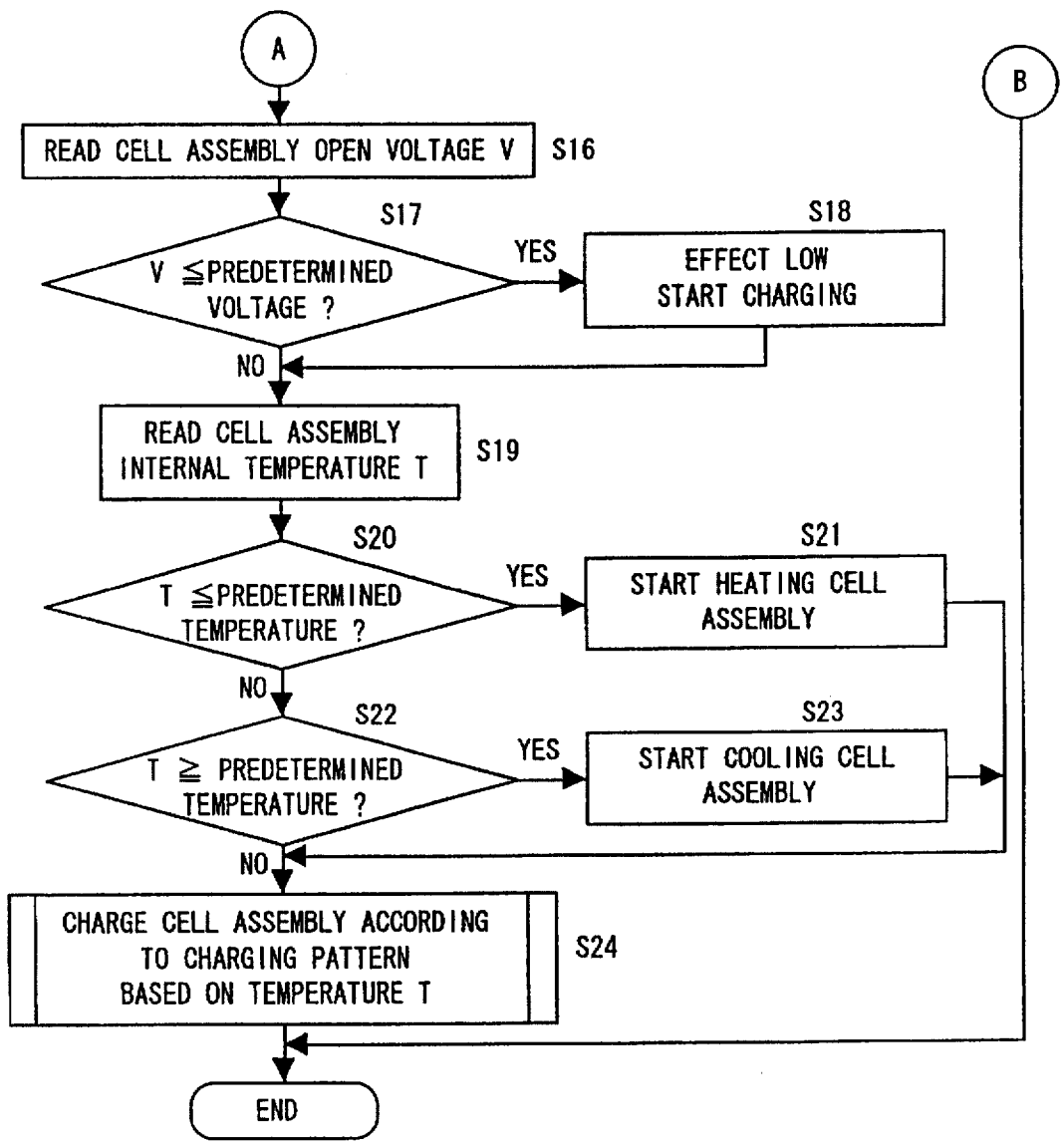

A control sequence of the charging control apparatus 1 will be described below with reference to FIGS. 2 and 3.

When the charging of the secondary battery 21 is indicated by a charging command switch (not shown), the switches 33, 34 are turned on by the CPU 27 to connect the secondary battery 21 to the charger 11.

Then, the charging control apparatus 1 reads a total discharged quantity (Ck) calculated by the total discharged quantity calculating circuit 29 in a step S1, and then decides whether or not the read total discharged quantity (Ck) is equal to or greater than a multiple (e.g., three times) of a rated capacity of the cell assembly 22 in a step S2. If the total discharged quantity (Ck) is equal to or greater than the multiple of the rated capacity of the cell assembly 22, then the charging control apparatus 1 executes a uniformizing charging mode for uniformizing the capacities of the unit cells of the cell assembly 22 after they are charged, irrespective of irregular discharged quantities of the unit cells, in a step S3.

Generally, when the cell assembly 22 is repeatedly charged and discharged in use, the discharged quantities of electric energy from the unit cells become irregular, i.e., different from each other. For example, the discharged quantities of electric energy from the unit cells on the opposite ends of the cell assembly 22 are greater, whereas the discharged quantities of electric energy from the unit cells in the central area of the cell assembly 22 are smaller. Such irregular discharged quantities can be uniformized when the cell assembly 22 is charged with a small current for a long period of time in the uniformizing charging mode.

A charging pattern in the uniformizing charging mode is shown by way of example in FIG. 4(E). According to the illustrated charging pattern, the cell assembly 22 is charged with a constant electric energy of, e.g., 5.4 kW, which is about 25% of the capacity of the cell assembly 22, (about 1.17 times, experimentally determined, the nominal output energy of 4.6 kW). When the voltage across the cell assembly 22 reaches a switching voltage of, e.g., 360 V (1.25 times the nominal voltage (12×24=288 V) of the cell assembly 22) while the cell assembly 22 is being charged with the constant electric energy, the cell assembly 22 starts being charged with a constant current of, e.g., 8 A, which is about 50% of the nominal current (16 A) of the cell assembly 22. When the voltage across the cell assembly 22 reaches the switching voltage of 360 V while the cell assembly 22 is being charged with the constant current, the constant current changes to 1/2, i.e., 4 A, to charge the cell assembly 22. When the voltage across the cell assembly 22 subsequently reaches the switching voltage of 360 V while the cell assembly 22 is being charged with a constant current of 1 A, the cell assembly 22 is charged with the constant switching voltage until it is fully charged. In FIG. 4(E), the vertical axis of the graph represents a current. However, the cell assembly 22 starts being charged with the constant electric energy. The internal resistance of the cell assembly 22 varies depending on the remaining capacity of the cell assembly 22 immediately before it starts being charged and the temperature of the cell assembly 22 while it is being charged. While the cell assembly 22 is being charged with the constant electric energy, the charging current progressively drops with time depending on the internal resistance of the cell assembly 22. Therefore, the charging pattern is represented by the current as it varies with time.

If the total discharged quantity (Ck) is neither equal to nor greater than the multiple of the rated capacity of the cell assembly 22 in the step S2, then the charging control apparatus 1 reads a left-to-stand time (Th) in a step S4. The left-to-stand time (Th) is a period of time in which the cell assembly 22 is left to stand without being charged or discharged. Then, the charging control apparatus 1 decides whether or not the left-to-stand time (Th) is equal to or longer than a predetermined time, e.g., one week or 168 hours, in a step S5.

If the left-to-stand time (Th) is equal to or longer than the predetermined time, then the charging control apparatus 1 executes the uniformizing charging mode in a step S6. In the uniformizing charging mode in the step S6, the charging control apparatus 1 charges the cell assembly in the same charging pattern as that in the uniformizing charging mode in the step S3.

The charging control apparatus 1 executes the uniformizing charging mode in the step S6 because after the cell assembly 22 is left to stand over a long period of time, the discharged quantities of electric energy from the unit cells become irregular, i.e., different from each other. For example, the discharged quantities of electric energy from the unit cells on the opposite ends of the cell assembly 22 are greater, whereas the discharged quantities of electric energy from the unit cells in the central area of the cell assembly 22 are smaller, in the same manner as when the total discharged quantity (Ck) of electric energy from the cell assembly 22 is large as described above. Such irregular discharged quantities can be uniformized when the cell assembly 22 is charged with a small current for a long period of time in the uniformizing charging mode. The cell assembly 22 can be fully charged without being degraded in the uniformizing charging mode.

If the left-to-stand time (Th) is neither equal to nor longer than the predetermined time in the step S5, then the charging control apparatus 1 reads an open voltage of the cell assembly 22 in a step S7. The open voltage of the cell assembly 22 is detected by the voltage detector 23 when the switches 33, 34 are turned off. After the step S7, the charging control apparatus 1 searches the ROM 28 for a self-discharged quantity of electric energy from the cell assembly 22 based on the read open voltage. Then, the charging control apparatus 1 determines whether or not the absolute value of the difference between a discharged quantity (Ch) which is representative of an integrated value of a load current (discharged current) supplied from the cell assembly 22 to the electric vehicle propulsion motor from the fully charged condition of the cell assembly 22, and the self-discharged quantity retrieved from the ROM 28 is equal to or greater than a predetermined capacity of, e.g., 10 Ah (about 17%, experimentally determined, of the rated capacity 60 Ah) in a step S8. The discharged quantity (Ch) is also used in determining when the cell assembly 22 is fully charged at which time the discharged quantity (Ch) becomes nil by subtracting therefrom a substantial charging current that is the product of a charging current flowing from the electrodes of the cell assembly 22 into the cells and a charging efficiency.

If the absolute value of the difference between the discharged quantity (Ch) and the self-discharged quantity is equal to or smaller than the predetermined capacity in the step S8, then the charging control apparatus 1 determines that the present discharged quantity of electric energy from the cell assembly 22 is indefinite because of the self-discharging of the cell assembly 22, and executes a trouble charging mode in a step S9. In the trouble charging mode in the step S9, the charging control apparatus 1 charges the cell assembly in the same charging pattern as with the uniformizing charging pattern shown in FIG. 4(E).

In the trouble charging mode in the step S9, the charging control apparatus 1 charges the cell assembly in the same charging pattern as with the uniformizing charging pattern because the cell assembly 22 can be fully charged over a long period of time without being degraded.

If the absolute value of the difference between the discharged quantity (Ch) and the self-discharged quantity is neither equal to nor smaller than the predetermined capacity in the step S8, then the charging control apparatus 1 reads the discharged quantity (Ch) in a step S10. Thereafter, the charging control apparatus 1 decides whether or not the read discharged quantity (Ch) is equal to or smaller than a predetermined discharged quantity of, e.g., 6 Ah (about 10 experimentally determined, of the rated capacity 60 Ah) in a step S11. Stated otherwise, the charging control apparatus 1 checks if the discharged quantity of electric energy from the cell assembly 22 when it is charged is very small or not. If the read discharged quantity (Ch) is equal to or smaller than the predetermined discharged quantity, i.e., if the discharged quantity of electric energy from the cell assembly 22 is very small, then the charging control apparatus 1 executes a supplemental charging mode to charge the cell assembly 22 with a small constant current of, e.g., 2 A (about 12.5% of the nominal current (16 A) of the cell assembly 22)

according to a charging pattern shown in FIG. 4(F) in a step S12. When the voltage across the cell assembly 22 reaches a switching voltage of, e.g., 360 V (1.25 times the nominal voltage of the cell assembly 22) while the cell assembly 22 is being charged with the constant current, the cell assembly 22 starts being charged with a constant current which is ½ of 2 A. When the voltage across the cell assembly 22 reaches the switching voltage of 360 V while the cell assembly 22 is being charged with the constant current of 1 A, the cell assembly 22 is charged with the constant switching voltage until it is fully charged. The term "supplemental" in the supplemental charging mode is used to signify the supplementing of a small discharged quantity of electric energy from the cell assembly 22.

The cell assembly 22 is charged in the supplemental charging mode because if it were charged quickly while its discharged quantity is small, the temperature of the cell assembly 22 would be unduly increased, degrading the cell assembly 22.

If the read discharged quantity (Ch) is neither equal to nor smaller than the predetermined discharged quantity, i.e., if the discharged quantity of electric energy from the cell assembly 22 is not very small, then the charging control apparatus 1 reads the number of times that the charging of the cell assembly 22 is ended when it is not fully charged in a step S13. Thereafter, the charging control apparatus 1 decides whether or not the read number of times (Fk) is equal to or greater than "1" in a step S14. If the read number of times (Fk) is equal to or greater than "1", then the charging control apparatus 1 executes the trouble charging mode to charge the cell assembly 22 in the charging pattern shown in FIG. 4(E) in a step S15.

The charging control apparatus 1 executes the trouble charging mode in the step S15 for the purpose of fully charging the cell assembly 22 without being degraded because the charging of the cell assembly 22 is ended prior to its full charging and the charged status of the cell assembly 22 is indefinite.

If the read number of times (Fk) is neither equal to nor greater than "1" in the step S14, then the charging of the cell assembly 22 is not ended before it is fully charged, i.e., the charging of the cell assembly 22 is ended in the fully charged condition. After step S14, the charging control apparatus 1 reads the open voltage across the cell assembly 22 in a step S16. Thereafter, the charging control apparatus 1 decides whether or not the read open voltage (V) is equal to or smaller than a predetermined voltage of, e.g., 240 V (83~84% of the nominal voltage (288 V) of the cell assembly 22) in a step S17. If the read open voltage (V) is equal to or smaller than the predetermined voltage, then the charging control apparatus 1 executes a low start charging mode to charge the cell assembly 22 with a small constant current of, e.g., 2 A (about 12.5% of the nominal current (16 A) of the cell assembly 22) according to a charging pattern similar to the charging pattern shown in FIG. 4(F) in a step S18. When the voltage across the cell assembly 22 reaches a switching voltage of, e.g., 360 V (1.25 times the nominal voltage (288 V) of the cell assembly 22) while the cell assembly 22 is being charged with the constant current, the cell assembly 22 starts being charged with a constant current which is ½ of 2 A. When the voltage across the cell assembly 22 reaches the switching voltage of 360 V while the cell assembly 22 is being charged With the constant current of 1 A, the cell assembly 22 is charged with the constant switching voltage for a predetermined period of time.

The charging pattern in the step S18 is similar to the charging pattern shown in FIG. 4(F). In the low start charging mode, however, the charging of the cell assembly 22 is ended and the processing goes to a charging process described later on after the charging with the constant voltage is continued for the predetermined period of time, i.e., the charging with the constant voltage is ended after elapse of the predetermined period of time.

If the open voltage (V) is equal to or smaller than the predetermined voltage in the step S17, then the cell assembly 22 has been excessively charged. The internal resistance of the excessively charged cell assembly 22 tends to be large. If the excessively charged cell assembly 22 were charged with a large current, the temperature of the cell assembly 22 would be unduly increased, causing the cell assembly 22 to be degraded. In this case, since the cell assembly 22 starts being charged with a low constant current in the low start charging mode, the internal resistance of the cell assembly 22 is lowered back to a normal level. Thereafter, the processing goes to a normal charging process as described below. In this manner, the cell assembly 22 is prevented from being unduly degraded.

If the open voltage (V) is neither equal to nor smaller than the predetermined voltage in the step S17 or after the low start charging mode in the step S18, the charging control apparatus 1 reads an internal temperature (T) of the cell assembly 22 in a step S19. Then, the charging control apparatus 1 decides whether or not the read internal temperature (T) is equal to or smaller than a predetermined temperature of, e.g., 0° C., in a step S20. If the read internal temperature (T) is equal to or smaller than the predetermined temperature, then the charging control apparatus 1 executes a heating routine to heat the cell assembly 22 until the internal temperature (T) becomes neither equal to nor smaller than the predetermined temperature in a step S21.

If the read internal temperature (T) is neither equal to nor smaller than the predetermined temperature in a step S20, then the charging control apparatus 1 decides whether or not the read internal temperature (T) is equal to or greater than another predetermined temperature of, e.g., 45° C., in a step S22. If the read internal temperature (T) is equal to or greater than the predetermined temperature, then the charging control apparatus 1 executes a cooling routine to cool the cell assembly 22 until the internal temperature (T) becomes neither equal to nor greater than the predetermined temperature in a step S23.

After the step S21 or the step S23, the charging control apparatus 1 charges the cell assembly 22 according to a charging pattern based on the internal temperature (T) thereof in a step S24.

Charging patterns depending on the internal temperature of the cell assembly 22 will be described below.

If the internal temperature (T) of the cell assembly 22 is in the range of 45° C.>T≧40° C., then the charging control apparatus 1 charges the cell assembly 22 with a constant electric energy of, e.g., 4.4 kW (about 95%, experimentally determined, of the nominal output energy of 4.6 kW) until the voltage across the cell assembly 22 reaches a switching voltage of, e.g., 345.6 V (1.2 times the nominal voltage (288 V) of the cell assembly 22) according to a charging pattern shown in FIG. 4(A). When the voltage across the cell assembly 22 reaches the switching voltage, the cell assembly 22 starts being charged with a constant current of, e.g., 2.0 A, which is 12.5% of the nominal current (16 A) of the cell assembly 22 until it is fully charged.

When the cell assembly 22 is charged, the amount of heat generated by the cell assembly 22 per unit time is proportional to the charging current supplied to the cell assembly 22. For charging the cell assembly 22 which is of a high temperature, it is effective to charge the cell assembly 22 with as low a charging current as possible in order to avoid excessive heating of the cell assembly 22. When the cell assembly 22 is of a high temperature, therefore, it is charged with low charging currents according to the charging pattern shown in FIG. 4(A). In FIG. 4(A), the vertical axis of the graph represents a current. However, the cell assembly 22 starts being charged with the constant electric energy. The internal resistance of the cell assembly 22 varies depending on the remaining capacity of the cell assembly 22 immediately before it starts being charged and the temperature of the cell assembly 22 while it is being charged. While the cell assembly 22 is being charged with the constant electric energy, the charging current progressively drops with time depending on the internal resistance of the cell assembly 22. Therefore, the charging pattern is represented by the current as it varies with time.

If the internal temperature (T) of the cell assembly 22 is in the range of 40° C.>T≧20° C., then the charging control apparatus 1 charges the cell assembly 22 with a constant electric energy of, e.g., 5.4 kW (about 1.17 times, experimentally determined, of the nominal output energy of 4.6 kW) until the voltage across the cell assembly 22 reaches a switching voltage of, e.g., 345.6 V (1.2 times the nominal voltage (288 V) of the cell assembly 22) according to a charging pattern shown in FIG. 4(B). When the voltage across the cell assembly 22 reaches the switching voltage, the cell assembly 22 starts being charged with a constant current of, e.g., 3.4 A, which is about 20% of the nominal current (16 A) of the cell assembly 22 until it is fully charged. In FIG. 4(B), the vertical axis of the graph represents a current. However, the cell assembly 22 starts being charged with the constant electric energy. The internal resistance of the cell assembly 22 varies depending on the remaining capacity of the cell assembly 22 immediately before it starts being charged and the temperature of the cell assembly 22 while it is being charged. While the cell assembly 22 is being charged with the constant electric energy, the charging current progressively drops with time depending on the internal resistance of the cell assembly 22. Therefore, the charging pattern is represented by the current as it varies with time.

While the internal temperature (T) of the cell assembly 22 is in the range of 40° C.>T≧20° C., i.e., when the cell assembly 22 is at normal temperature, the cell assembly 22 is charged at a first stage with the constant electric energy, maximally utilizing an inputted electric energy with good charging efficiency, and then charged at a second stage with the constant current not in excess of an oxygen absorbing capability of the unit cells of the cell assembly 22.

If the internal temperature (T) of the cell assembly 22 is in the range of 20° C.>T≧5° C., then the charging control apparatus 1 charges the cell assembly 22 with a constant electric energy of, e.g., 5.4 kW (about 1.17 times, experimentally determined, of the nominal output energy of 4.6 kW) until the voltage across the cell assembly 22 reaches a switching voltage of, e.g., 345.6 V (1.2 times the nominal voltage (288 V) of the cell assembly 22) according to a charging pattern shown in FIG. 4(C). When the voltage across the cell assembly 22 reaches the switching voltage, the cell assembly 22 starts being charged with a constant current of, e.g., 8 A, which is about 50% of the nominal current (16 A) of the cell assembly 22. When the voltage across the cell assembly 22 thereafter reaches the switching voltage, the constant current changes to ½, i.e., 4 A, to charge the cell assembly 22. When the voltage across the cell assembly 22 subsequently reaches the switching voltage, the cell assembly 22 is charged with a constant current of, e.g., 2 A until it is fully charged. In FIG. 4(C), the vertical axis of the graph represents a current. However, the cell assembly 22 starts being charged with the constant electric energy. The internal resistance of the cell assembly 22 varies depending on the remaining capacity of the cell assembly 22 immediately before it starts being charged and the temperature of the cell assembly 22 while it is being charged. While the cell assembly 22 is being charged with the constant electric energy, the charging current progressively drops with time depending on the internal resistance of the cell assembly 22. Therefore, the charging pattern is represented by the current as it varies with time.

If the internal temperature (T) of the cell assembly 22 is in the range of 5° C.>T>0° C., then the charging control apparatus 1 charges the cell assembly 22 with a constant electric energy of, e.g., 5.4 kW (about 1.17 times, experimentally determined, of the nominal output energy of 4.6 kW) until the voltage across the cell assembly 22 reaches a switching voltage of, e.g., 360 V (1.25 times the nominal voltage (288 V) of the cell assembly 22) according to a charging pattern shown in FIG. 4(C). When the voltage across the cell assembly 22 reaches the switching voltage, the cell assembly 22 starts being charged with a constant current of, e.g., 8 A, which is about 50% of the nominal current (16 A) of the cell assembly 22. When the voltage across the cell assembly 22 thereafter reaches the switching voltage, the constant current changes to ½, i.e., 4 A, to charge the cell assembly 22. When the voltage across the cell assembly 22 subsequently reaches the switching voltage, the cell assembly 22 is charged with a constant current of, e.g., 2 A. When the voltage across the cell assembly 22 subsequently reaches the switching voltage, the cell assembly 22 is charged with a constant current of, e.g., 1 A until it is fully charged. When the voltage across the cell assembly 22 reaches the switching voltage again, the cell assembly 22 is charged with the constant switching voltage until it is fully charged. In FIG. 4(D), the vertical axis of the graph represents a current. However, the cell assembly 22 starts being charged with the constant electric energy. The internal resistance of the cell assembly 22 varies depending on the remaining capacity of the cell assembly 22 immediately before it starts being charged and the temperature of the cell assembly 22 while it is being charged. While the cell assembly 22 is being charged with the constant electric energy, the charging current progressively drops with time depending on the internal resistance of the cell assembly 22. Therefore, the charging pattern is represented by the current as it varies with time.

When the internal temperature (T) of the cell assembly 22 is in the ranges of 20° C.>T≧5° C. and 5° C.>T>0° C., the oxygen absorbing capability of the negative electrodes of the unit cells of the cell assembly 22 and the charging efficiency are greatly reduced at a final stage of the charging process. In the low temperature ranges, it is therefore necessary to lower the charging current in a manner commensurate with the reduction of the oxygen absorbing capability for thereby preventing the cell assembly 22 from suffering an excessive voltage. It is also necessary to control the charged quantity of electric energy in the cell assembly 22 in manner commensurate with the reduction of the charging efficiency at the final stage of the charging process. To meet these requirements, when the internal temperature (T) of the cell assembly 22 is in the ranges of 20° C.>T≧5° C. and 5° C.>T>0° C., the charging current changes stepwise to progressively smaller levels in order to shorten the period of time required to charge the cell assembly 22.

When the internal temperature (T) of the cell assembly 22 is in the range of 5° C.>T>0° C., the charging efficiency is lower and the apparent internal resistance of the cell assembly 22 is higher. Consequently, the voltage across the cell assembly 22 reaches the normal switching voltage of 345.6 V before the fully charged status (charged quantity (Ch)=0) is reached. For this reason, in a final stage of the charging process, the cell assembly 22 is charged with a low current of 1 A and a constant voltage of 360 V so that the electrodes of the unit cells will not be degraded due to the fully charged status which would otherwise be reached with the charging current of 2 A.

According to the charging control process in the illustrated embodiment, as described above, since the charging of the cell assembly 22 is controlled according to a charging pattern based on the status of the cell assembly 22 immediately before it starts being charged, the cell assembly 22 can be charged according to the charging pattern that matches the manner in which the electric vehicle is used, even though the electric vehicle may be used differently by different users. As a consequence, the cell assembly 22 is prevented from being unduly degraded.

In the illustrated embodiment, the charger 11 and the charging control apparatus 1 are shown as being independent of each other. However, the charger 11 and the charging control apparatus 1 may be combined into an integral unitary system.

Although a certain preferred embodiment of the present invention has been shown and described in detail, it should be understood that various changes and modifications may be made therein without departing from the scope of the appended claims.

What is claimed is:

1. A charging control apparatus for charging a secondary battery, comprising:

a decision circuit for determining a discharged status of a secondary battery prior to when the secondary battery starts being charged; and a charging pattern control circuit for controlling a charging current supplied to the secondary battery at progressively smaller constant stepwise levels according to a charging pattern based on the discharged status of the secondary battery as determined by said decision circuit each time a voltage across the secondary battery reaches a first predetermined value, and charging the secondary battery with the charging current which is controlled at said progressively smaller constant stepwise levels.

2. A charging control apparatus according to claim 1, wherein said decision circuit comprises voltage drop decision means for determining when an open voltage across the secondary battery is reduced below an open voltage predetermined value when the secondary battery starts being charged, and wherein said charging pattern control circuit comprises low start charging control means for controlling the charging current supplied to the secondary battery at progressively smaller constant stepwise levels according to a first predetermined charging pattern each time the voltage across the secondary battery reaches a second predetermined value when the open voltage across the secondary battery is reduced below the open voltage predetermined value as determined by said voltage drop decision means, charging the secondary battery with the charging current which is controlled at said progressively smaller constant stepwise levels, and continuously charging the secondary battery with a predetermined constant voltage for a predetermined period of time after the secondary battery has been charged with constant current according to said first predetermined charging pattern.

3. A charging control apparatus according to claim 2, wherein said decision circuit comprises temperature detecting means for detecting an internal temperature of the secondary battery when the secondary battery starts being charged, and wherein said charging pattern control circuit comprises charging control means for controlling the charging current supplied to the secondary battery at progressively smaller constant stepwise levels according to a second predetermined charging pattern based on the temperature detected by said temperature detecting means each time the voltage across the secondary battery reaches a temperature detected predetermined value, and charging the secondary battery with the charging current which is controlled at said progressively smaller constant stepwise levels until the secondary battery is fully charged, after the secondary battery is charged by said low start charging control means.

4. A charging control apparatus according to claim 1, wherein said decision circuit comprises total discharged quantity decision means for determining when a total discharged quantity of electric energy from the secondary battery during a period of time from an end of charging of the secondary battery to a start of charging of the secondary battery exceeds a predetermined total discharged quantity, and a non-use period decision means for determining when a period of time in which the secondary battery is not used exceeds a predetermined period of time, and wherein said charging pattern control circuit comprises charging control means for controlling the charging current supplied to the secondary battery at progressively smaller constant stepwise levels according to a predetermined charging pattern each time the voltage across the secondary battery reaches a predetermined value when the total discharged quantity of electric energy from the secondary battery exceeds said predetermined total discharged quantity as determined by said total discharged quantity decision means or the period of time in which the secondary battery is not used exceeds said predetermined period of time as determined by said non-use period decision means, and charging the secondary battery with the charging current which is controlled at said progressively smaller constant stepwise levels until the secondary battery is fully charged.

5. A charging control apparatus according to claim 1, wherein said decision circuit comprises discharged quantity decision means for determining when a discharged quantity of electric energy from the secondary battery, from which a charged quantity of electric energy in the secondary battery each time the secondary battery is charged is subtracted, is smaller than a predetermined level, and wherein said charging pattern control circuit comprises charging control means for controlling the charging current supplied to the secondary battery at progressively smaller constant stepwise levels according to a predetermined charging pattern each time the voltage across the secondary battery reaches a predetermined value when said discharged quantity of electric energy from the secondary battery is smaller than said predetermined level as determined by said discharged quantity decision means, charging the secondary battery with the charging current which is controlled at said progressively smaller constant stepwise levels, and charging the secondary battery with a predetermined constant voltage until the secondary battery is fully charged after the secondary battery has been charged with constant current according to said predetermined charging pattern.

6. A charging control apparatus according to claim 1, wherein said decision circuit comprises self-discharged quantity decision means for determining when an absolute value of the difference between a discharged quantity of electric energy from the secondary battery, from which a charged quantity of electric energy in the secondary battery each time the secondary battery is charged is subtracted, and a self-discharged quantity of electric energy from the secondary battery based on an open voltage across the secondary battery when the secondary battery starts being charged exceeds a predetermined value, and wherein said charging pattern control circuit comprises charging control means for controlling the charging current supplied to the secondary battery at progressively smaller constant stepwise levels according to a predetermined charging pattern each time the voltage across the secondary battery reaches a second predetermined value when said absolute value exceeds said predetermined value as determined by said self-discharged quantity decision means, and charging the secondary battery with the charging current which is controlled at said progressively smaller constant stepwise levels until the secondary battery is fully charged.

* * * * *